US008561107B1

(12) United States Patent
O'Neil (10) Patent No.: US 8,561,107 B1
(45) Date of Patent: Oct. 15, 2013

(54) METHOD AND APPARATUS FOR SELECTING CUSTOMIZED MULTIMEDIA CONTENT FOR A USER IN PERVASIVE COMPUTING ENVIRONMENTS

(75) Inventor: Joseph Thomas O'Neil, Staten Island, NY (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1726 days.

(21) Appl. No.: 10/192,214

(22) Filed: Jul. 10, 2002

(51) Int. Cl.
*H04N 5/445* (2011.01)

(52) U.S. Cl.
USPC ............................................. 725/46; 725/39

(58) Field of Classification Search
USPC ........... 725/38, 46, 114, 37, 141, 39; 341/175
See application file for complete search history.

(56) References Cited

U.S. PATENT DOCUMENTS

| | | | |
|---|---|---|---|
| 5,801,747 A * | 9/1998 | Bedard | 725/46 |
| 6,016,520 A | 1/2000 | Facq et al. | |
| 6,047,327 A | 4/2000 | Tso et al. | |
| 6,104,334 A * | 8/2000 | Allport | 341/175 |
| 6,130,726 A * | 10/2000 | Darbee et al. | 348/734 |
| 6,407,779 B1 * | 6/2002 | Herz | 348/734 |
| 6,463,518 B1 * | 10/2002 | Duboc | 711/220 |
| 6,651,253 B2 * | 11/2003 | Dudkiewicz et al. | 725/114 |
| 6,687,740 B1 | 2/2004 | Gough et al. | |
| 6,714,797 B1 | 3/2004 | Rautila | |
| 6,760,601 B1 | 7/2004 | Suoknuuti et al. | |
| 6,763,343 B1 | 7/2004 | Brooke et al. | |
| 6,771,749 B1 | 8/2004 | Bansal et al. | |
| 6,772,160 B2 | 8/2004 | Cho et al. | |
| 7,099,946 B2 | 8/2006 | Lennon et al. | |
| 7,277,928 B2 | 10/2007 | Lennon | |
| 7,533,400 B1 * | 5/2009 | Hailey et al. | 725/49 |
| 2001/0034736 A1 | 10/2001 | Eylon et al. | |
| 2002/0066026 A1 | 5/2002 | Yau et al. | |
| 2002/0078818 A1 | 6/2002 | Elliott | |
| 2002/0084898 A1 * | 7/2002 | Stefanik | 340/571 |
| 2002/0092019 A1 | 7/2002 | Marcus | |
| 2002/0152267 A1 | 10/2002 | Lennon | |
| 2002/0152318 A1 | 10/2002 | Menon et al. | |
| 2002/0184095 A1 * | 12/2002 | Scullard et al. | 705/14 |
| 2003/0009589 A1 | 1/2003 | Apostolopoulos et al. | |

(Continued)

FOREIGN PATENT DOCUMENTS

WO  WO 00/52928  * 9/2000

OTHER PUBLICATIONS

Lassila, Ora Web Metadata: A Matter of Semantics Internet Computing, IEEE Jul./Aug. 1998 vol. 2, Issue: 40 on p. 30-37.*
Satyanarayanan "Pervasive Computing: Vision and Challenges", :IEEE Personal Communications., Aug. 2001, 10 pages.
Satyanarayanan "Mobiie Informations Access", IEEE Personal Communications, Feb. 1996; pp. 26-33.

(Continued)

*Primary Examiner* — Nasser Goodarzi
*Assistant Examiner* — Hyun Hong (57) ABSTRACT

A method of delivering and minimizing duplication of multimedia content to users in pervasive computing environments is disclosed. A mobile device enters a first environment and establishes a short-range wireless connection to a non-mobile device in its proximity. The non-mobile device transmits metadata as it displays content. The metadata is received by the mobile device and stored in a local buffer. The mobile device accumulates a viewing history of content that has recently been viewed. The mobile device later enters a second environment and establishes short-range wireless connection to another non-mobile device. The viewing history is transmitted from the mobile to the non-mobile device and is used to select and sequence content.

32 Claims, 13 Drawing Sheets

(56) References Cited

U.S. PATENT DOCUMENTS

| | | |
|---|---|---|
| 2003/0023427 A1 | 1/2003 | Cassin et al. |
| 2003/0061206 A1 | 3/2003 | Qian |
| 2003/0061298 A1 | 3/2003 | Berman et al. |
| 2003/0084448 A1* | 5/2003 | Soundararajan ............... 725/46 |
| 2003/0093790 A1* | 5/2003 | Logan et al. ................... 725/38 |
| 2003/0105719 A1 | 6/2003 | Berger et al. |
| 2003/0112467 A1* | 6/2003 | McCollum et al. .......... 358/1.18 |
| 2004/0261096 A1 | 12/2004 | Matz |
| 2004/0268386 A1 | 12/2004 | Logan et al. |

OTHER PUBLICATIONS

Debaty et al. "Uniform Web Presence Architecture for People, Place, and Things", IEEE Personal Communications, Aug. 2001, 12 pages.

Zimmerman "Wireless Networked Digital Devices: A New Paradigm for Computing and Communication", IBM Systems Journal, vol. 38, No. 4, 1999, pp. 566-574.

The book "Digital Video: An Introduction to MPEG-2 (Digital Multimedia Standards Beries)" by Haskell et al., Chapman and Hall, 1996.

* cited by examiner

USER PROFILE

Information Sources    704 cnn, nbc, abc, cbs, yahoo, realaudio

Information Priorities:    706

AT&T, economy, terrorism, severe weather, New York City, medicine

Duration of Information Summary:    708

30 minutes

Eliminate duplication ?  ☒ — 710

Submit — 712          714 — Cancel

VIEWING HISTORY

CNN, Greenspan predicts recovery from recession
NBC, House committee hears Greenspan testimony
Yahoo, Dow rises on Greenspon testimony
ABC, Greenspan testimony boosts Dow and Nasdaq NBC, Severe blizzard in Midwest
CBS, Midwest airports closed
Yahoo, Heavy snow causes transportation shutdowns CNN, Recovery efforts continue at World Trade Center
ABC, Bush package gives 21 billion dollars to New York City
CBS, Rebuilding plans for lower Manhattan CBS, Bloomberg discusses budget shortfall
Realaudio, Interview with Michael Bloomberg CNN, Advances in anti-aging research
Realaudio, Interview with medical researcher

[Previous] ~812      814~ [Next]

1402 — <?xml version="1.0" encoding="US_ASCII"?>
1404 — <!ELEMENT content-metadata (radio, television, web)>
1406 — <!ELEMENT radio (title, source, date, time, duration, keywords)>
1408 — <!ELEMENT television (title, source, date, time, duration, keywords)>
1410 — <!ELEMENT web (title, source, keywords)>
1412 — <!ELEMENT title (#PCDATA)>
1414 — <!ELEMENT source (#PCDATA)>
1416 — <!ELEMENT date (#PCDATA)>
1418 — <!ELEMENT time (#PCDATA)>
1420 — <!ELEMENT duration (#PCDATA)>
1422 — <!ELEMENT keywords (#PCDATA)>
1424 — <!ELEMENT reporter (#PCDATA)>

FIG. 15

1502 — <?xml version="1.0" encoding="US-ASCII"?>
1504 — <content-metadata>
  1506 — <radio>
    1508 — <title?>Stem Cell Research
    1510 — <source/>ABC News
    1512 — <date/>April 25, 2002
    1514 — <time/>9:17 AM EST
    1516 — <duration/>4.0 minutes
    1518 — <keywords/>medicine, genetic engineering, pharmaceuticals
    1520 — <reporter/>Peter Jennings
  1522 — </radio>
1524 — </content-metadata>

FIG. 16

1602 — <?xml version="1.0" encoding="US-ASCII"?>
1604 — <content-metadata>
1606 — <television>
1608 — <title/>News report about genetic engineering
1610 — <source/>CBS News
1612 — <date/>April 20, 2002
1614 — <time/>6:45 PM EST
1618 — <duration/>3.5 minutes
1620 — <keywords/>medicine, genetic engineering, pharmaceuticals
1622 — <reporter/>Dan Rather
1624 — </television>
1626 — </content-metadata>

FIG. 17

1702 — <?xml version="1.0" encoding="US-ASCII"?>
1704 — <content-metadata>
1706 — <web>
1708 — <title/>News report about genetic engineering
1710 — <source/>http://www.pbs.org/science/gene-therapy.ra
1712 — <date/>April 20, 2002
1714 — <time/>6:45 PM EST
1716 — <duration/>5.0 minutes
1718 — <keywords/>medicine, genetic engineering, pharmaceuticals
1720 — <reporter/>Alan Alda
1722 — </web>
1724 — </content-metadata>

METHOD AND APPARATUS FOR SELECTING CUSTOMIZED MULTIMEDIA CONTENT FOR A USER IN PERVASIVE COMPUTING ENVIRONMENTS

FIELD OF THE INVENTION

This invention relates to information delivery in pervasive computing environments. Specifically, a method and apparatus are defined to customize delivery of multimedia content and to minimize duplication of information for users in these environments.

BACKGROUND OF THE INVENTION

A pervasive computing environment contains a high density of mobile and non-mobile information devices. It provides easy access to information at any time, from any place, on any device. These devices span a wide range of complexity. They include set top boxes, stereos, radios, televisions, and other appliances that are familiar to consumers. They also include handheld and wearable devices that are embedded in clothing and jewelry. These devices can adapt their behavior to their user and surroundings.

There are many research and prototyping activities in this field. The article "Pervasive Computing: Vision and Challenges" by Satyanarayanan in IEEE Personal Communications, August 2001 is an excellent overview of these efforts. It is incorporated by reference. Other relevant articles include "Mobile Information Access" by Satyanarayanan in IEEE Personal Communications, February 1996 and "Uniform Web presence Architecture for People, Places, and Things" by Debaty and Caswell in IEEE Personal Communications, August 2001.

Personal area networks (PANs) allow devices in the same environment to establish wireless connections, discover resources, and share information. The article "Wireless Networked Digital Devices: A New Paradigm Computing and Communication" by Zimmerman in IBM Systems Journal, Volume 38, Number 4, 1999 provides an excellent overview of these technologies. Bluetooth, IrDA, and HomeRF are examples of wireless technologies. Specifications are available on the Internet.

Users in pervasive computing environments receive information from many sources. Radio and television stations transmit news programs containing reports about local, national, and international events. Streaming and non-streaming multimedia content is available from the Internet.

These sources often duplicate information. Competing television stations discuss the same events. Each broadcaster duplicates reports on their local and national programs. Information from popular Web portals duplicates that which is available from radio and television stations. For example, a consumer may visit a Web portal and learn about important news developments of the day. The information may be repeated on a radio program during a commute home. Finally, a television program delivered by a set top box may also report the same information.

Consumers need an efficient way to assimilate this information. Duplication should be minimized unless a user specifically requests additional details or perspectives on an event or topic. Maximum benefit must be obtained from the time spent viewing news and other information.

SUMMARY OF THE INVENTION

Limitations of the prior art are overcome and technical advance is made by the present invention. It minimizes duplication of information and, therefore, enables a user to efficiently assimilate information from many different content providers (e.g. radio, television, and Web) in pervasive computing environments.

Content providers generate and transmit metadata for their information. This metadata provides additional detail about the content (e.g. content provider, date/time of delivery, topic, duration).

Mobile and non-mobile devices (e.g. personal computers, personal digital assistants, radios, set top boxes, televisions) are enhanced to contain short-range wireless transceivers. The devices use these transceivers to communicate with each other and select content that is most valuable for a consumer and do not duplicate information that has already been received by that individual.

Mobile devices maintain a user profile and one or more viewing history tables. The use profile specifies the topics in which the user has an interest. A priority may be assigned to each topic. Preferences for different content providers may also be indicated. The viewing history stores metadata for information that has already been received by that individual.

In an embodiment of this invention, non-mobile and mobile devices contain software to select and sequence content. The mobile device obtains a list of relevant content that is stored on a non-mobile device. The mobile device selects a subset of this content and specifies the sequence in which it should be presented. These instructions are then communicated to the non-mobile devices.

BRIEF DESCRIPTION OF THE DRAWINGS

The above-summarized invention will be more fully understood upon consideration of the following detailed description and the attached drawings wherein.

DETAILED DESCRIPTION

Figure 1:
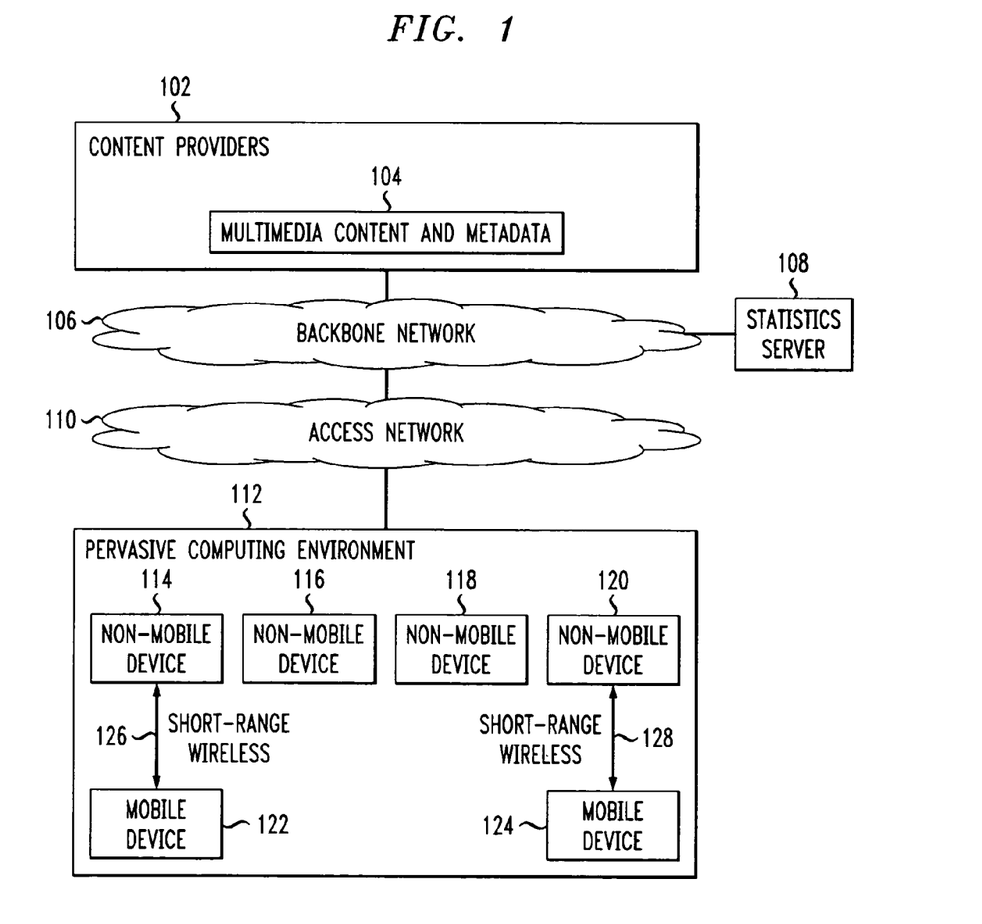
FIG. 1 shows the system architecture for the first embodiment of the present invention.

FIG. 1 shows the system architecture for the first embodiment of the present invention. Content providers 102 generate multimedia content and metadata that is stored in a server 104 (e.g. streaming and non-streaming Internet content, television programs, or radio programs). This information is accessible via backbone network 106. Backbone network 106 can use wide area network technologies in the current art (e.g. circuit switching, packet switching). Multiple access networks 110 connect to the backbone network 106. Access network 110 can use a variety of technologies in the current art (e.g. hybrid fiber coax, digital subscriber loop, wireless).

The current art provides techniques by which content providers may generate, store, and transmit metadata for their information. For example, the MPEG-2 video format enables metadata to be transmitted as a component of a digital video stream. The book "Digital Video: An Introduction to MPEG-2 (Digital Multimedia Standards Series)" by Haskell, et. al., Chapman and Hall, 1996 provides details.

Multiple pervasive computing environments (e.g home, work, school) connect to access network 110. An exemplary environment 112 may contain non-mobile devices 114-120 and mobile devices 122-124. Mobile devices 122-124 enter and exit these environments. Transient short-range wireless connections 126-128 are automatically established between a mobile device and non-mobile device via techniques in the current art.

As a mobile device 122 moves within an environment 112 (or moves among environments), connections are dynamically established and dropped to devices. Data is exchanged that enables the devices to adjust their behavior for the user of the mobile device and minimize repetitive presentation of information.

A statistics server 108 can accumulate statistics on the content that is selected for presentation. It can also accumulate statistics about advertising that is inserted into the presentation. Reports can be generated for all of these activities. This data can be shared with content providers for a fee.

Figure 2:
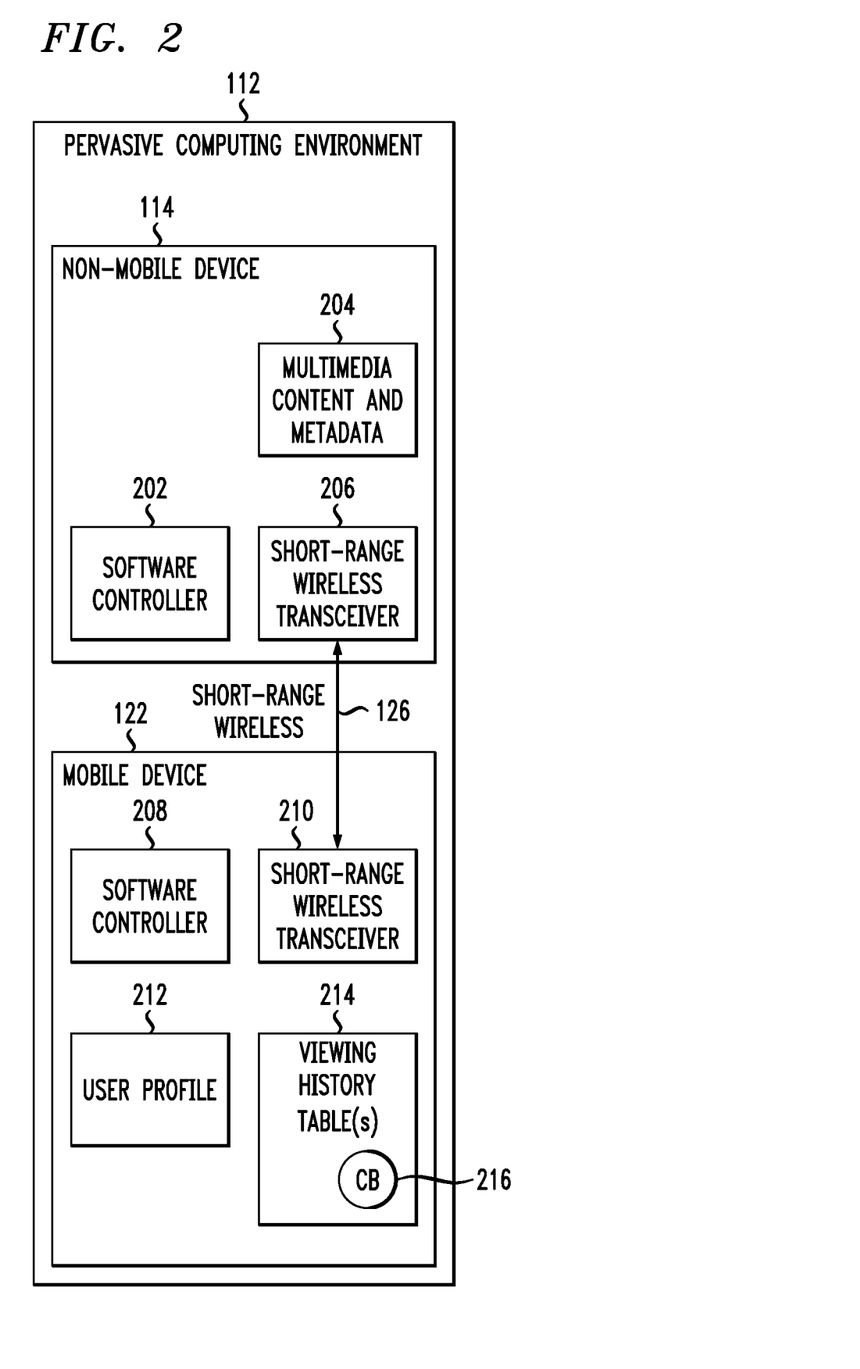
FIG. 2 shows additional detail for a non-mobile and mobile device.

FIG. 2 shows additional detail for an exemplary non-mobile device 114 and an exemplary mobile device 122 in an environment 112. The non-mobile device 114 contains a software controller 202, a server having stored multimedia content and metadata 204, and a short-range wireless transceiver 206. Components of the software controller may be dynamically downloaded to the device by using Java software technology. See the Java website at javasoft for additional details.

The mobile device 122 contains a software controller 208, short-range wireless transceiver 210, user profile 212 and viewing history or one more viewing history tables 214. The block 214 may also be a server that stores metadata received from non-mobile devices in one or more viewing tables and may also comprise a circular buffer 216. The user profile is generated based on data gathered by the mobile device 122 and preferences inputted by the user. Such preferences can include the type of content that is of interest to the user, the subject matter of interest, dates of interest, etc. The viewing, history is compiled by the mobile device 122 based on the data gathered from the short-range wireless transceiver 210. As the user travels from one environment to another, the content that the user is exposed to is captured by the short-range wireless transceiver 210. This data is used to help filter out desired content stored on the non-mobile device. This user profile and viewing history 214 are transmitted to a non-mobile device 114 so it can customize its behavior for the owner of the mobile device. A long range transceiver may be included in the mobile device for transmitting user profiles and viewing history to a network based profile server.

Figure 3:
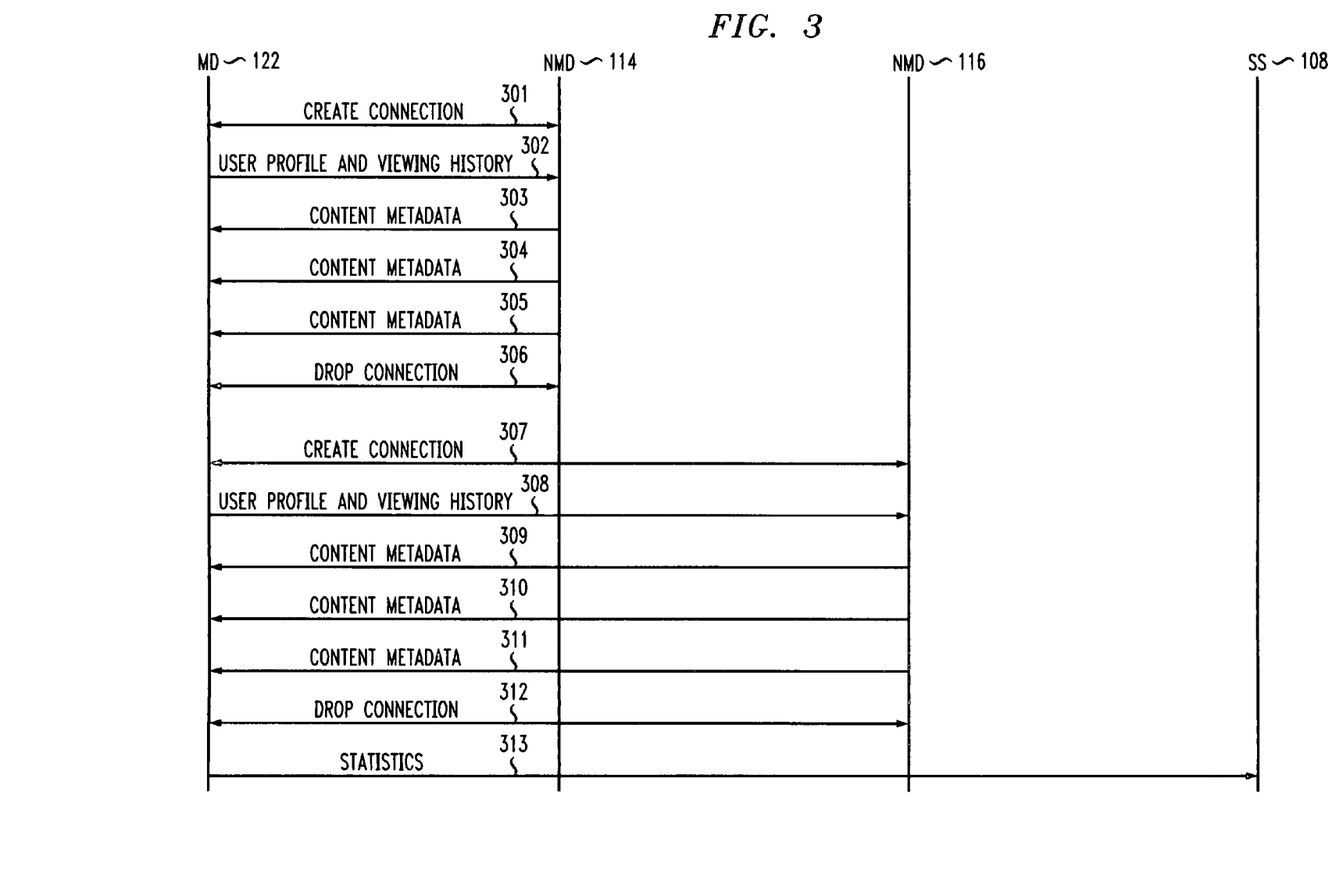
FIG. 3 shows the message sequence for the first embodiment of the present invention.

FIG. 3 shows how a mobile device 122 interacts with two non-mobile devices 114-116 and a statistics server 106. The mobile device 122 and non-mobile device 114 establish a connection via messages 301 according to techniques in the current art. Message 302 is then transmitted to the non-mobile device. This message contains the user profile and viewing history. The non-mobile device uses this data to select and sequence stored multimedia content. As content is presented, the metadata for that content is transmitted to the mobile device 122. This is done by messages 303-305. This metadata is stored in the viewing history 214 on the mobile device. The mobile device 122 then drops its connection to non-mobile device 114. This is shown as 306 on the diagram.

The mobile device 122 and non-mobile device 116 establish a connection via messages 307 according to techniques in the current art. Message 308 is then transmitted to the non-mobile device. This message contains the user profile and viewing history. The non-mobile device 116 uses this data to select and sequence stored multimedia content. As content is presented, the metadata for that content is transmitted to the mobile device 122. This is done by messages 309-311. This metadata is stored in the viewing history 214 on the mobile device. The mobile device 122 then drops its connection to non-mobile device 116. This is shown as 312 on the diagram.

The mobile device 122 may periodically transmit statistics to the statistics server 108. This data may indicate the specific multimedia content that was received by the mobile device. The statistics server can use this information to generate reports that can be distributed to content providers. Mobile devices may also be billed for this service.

Figure 4:
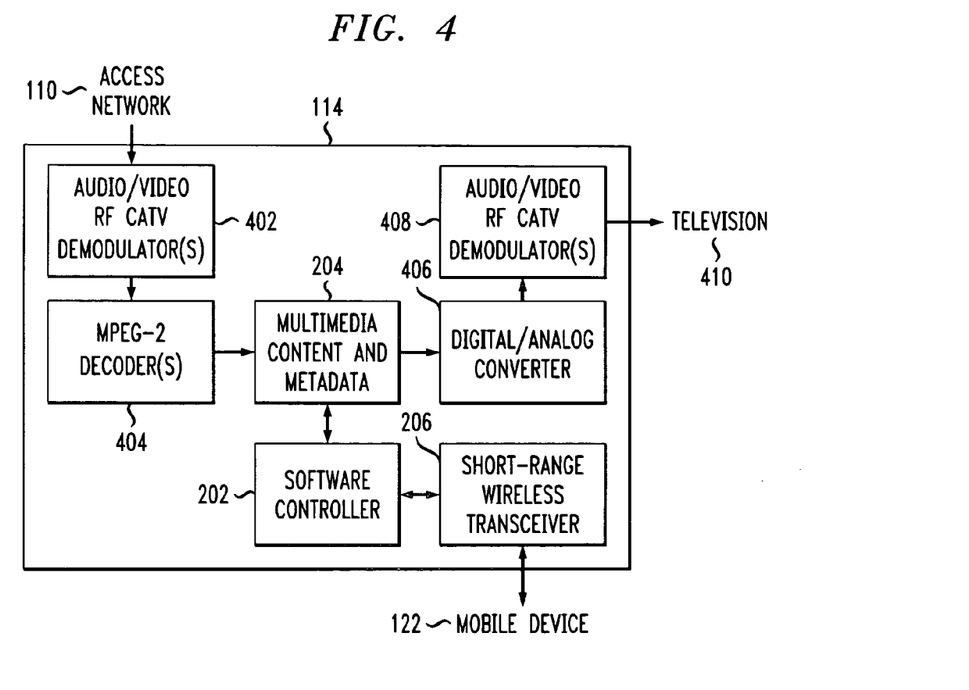
FIG. 4 shows a block diagram of a representative non-mobile device (viz. cable television set top box).

FIG. 4 shows a block diagram of a representative non-mobile device 114 (e.g. cable television set top box). The set top box connects to the access network 110 (e.g. hybrid fiber coax network) and receives television signals. These signals are supplied to one or more audio/video RF CATV demodulators 402. Output from the demodulators is supplied to one or more MPEG-2 decoders 404. Output from the decoders is stored in the multimedia content and metadata storage server 204.

The software controller 202 receives requests from a mobile device 122 via the short-range wireless transceiver 206. In response to these requests, the software controller 202 examines the metadata in server 204 and selects a subset of the content for that user. The content is retrieved from server 204 and output via digital/analog converter 406 and audio/video RF CATV modulator 408 to a television 410. The content can be viewed immediately or scheduled for viewing at a later date and/or time.

Several products in the current art can be for the present, invention. For example, digital video recorders are available from TiVO, Replay TV, and Microsoft. These products can be programmed to receive and store digital television content. Additional details can be found at the respective for these products.

Figure 5:
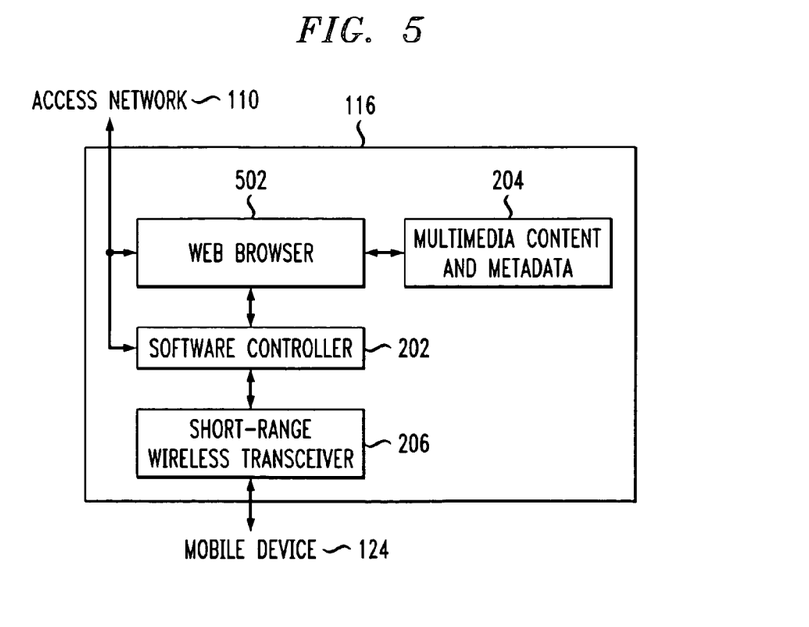
FIG. 5 shows a block diagram of a representative non-mobile device (viz. personal computer with Web browser).

FIG. 5 shows a block diagram of another representative non-mobile device 116 (e.g. personal computer). This device contains a Web browser 502. The software controller 202 receives requests from a mobile device 124 via the short-range wireless transceiver 206. In response to these requests, the software controller 202 examines the metadata in server 204 and selects a subset of the content for that user. The content is retrieved from server 204 and output via the Web browser 502.

Figure 6:
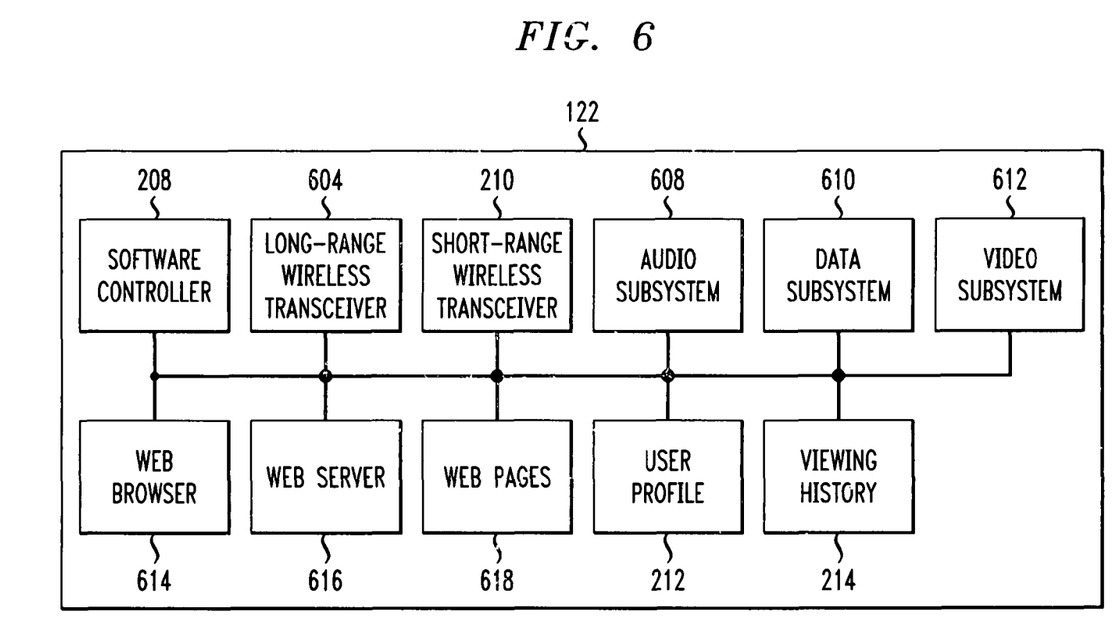
FIG. 6 shows a block diagram of a representative mobile device (viz. personal digital assistant).

FIG. 6 shows a block diagram of a representative mobile device 122 (e.g. cell phone, personal digital assistant). The software controller 208 coordinates execution of the various system components. Long-range wireless transceiver 604 is used for communication with a mobile switching center (MSC) in the current art. Short-range wireless transceiver 210 is used for communication with other devices in the local environment. The audio 608, data 610, and video 612 subsystems are used to input and output those specific media types. A Web browser 614 enables streaming and non-streaming multimedia content from the content providers 102 to be retrieved and displayed. A Web server 616 receives and processes requests for Web pages 618. These Web pages enable the user profile 212 to be examined and modified. They also enable the viewing history 214 to be examined.

Figure 7:
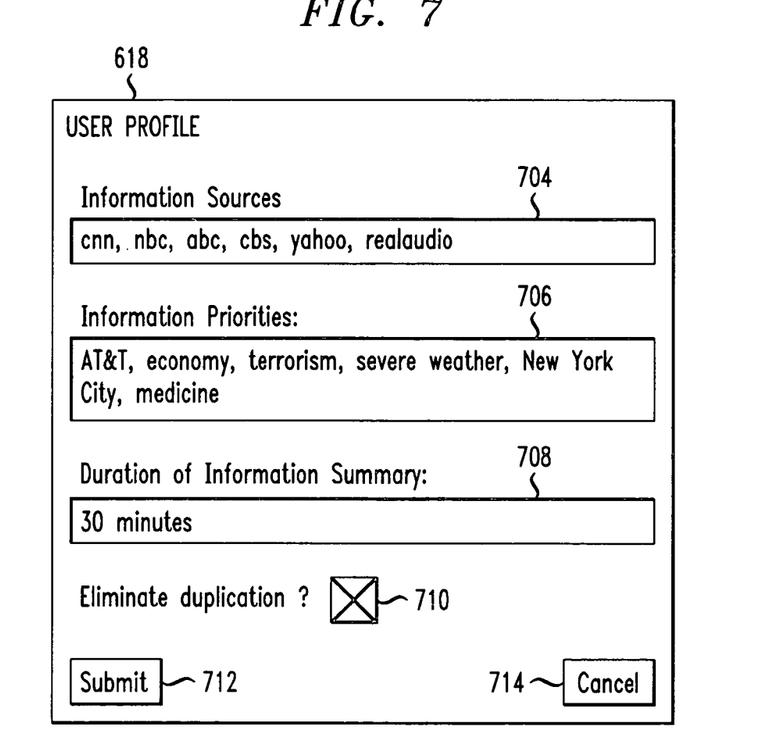
FIG. 7 shows a graphical user interface for examining and modifying the user profile that is stored on a mobile device.

FIG. 7 shows an exemplary Web page 618 for examining and modifying the user profile 212 that is stored on the mobile device 122. A user profile may specify a prioritized list of information sources 704. The information sources 704 may represent a number of different media such as broadcast, cable, web pages, audio downloads, etc. The sample data shows that the sources CNN, NBC, ABC, CBS, Yahoo and RealAudio are to be used. A user profile may also specify a prioritized list of topics 706. The sample data shows that the topics AT&T, economy, terrorism, severe weather, and New York City are to be used. The duration of an information summary 708 can also be defined. The sample data shows that the user wishes to view a composite information summary for thirty minutes. These thirty minutes will be filled with multimedia content that is retrieved from the content internally stored on the non-mobile device. A check box 710 enables the user to request that duplication of information be minimized. A submit button 712 and cancel button 714 submit and cancel form submission.

Figure 8:
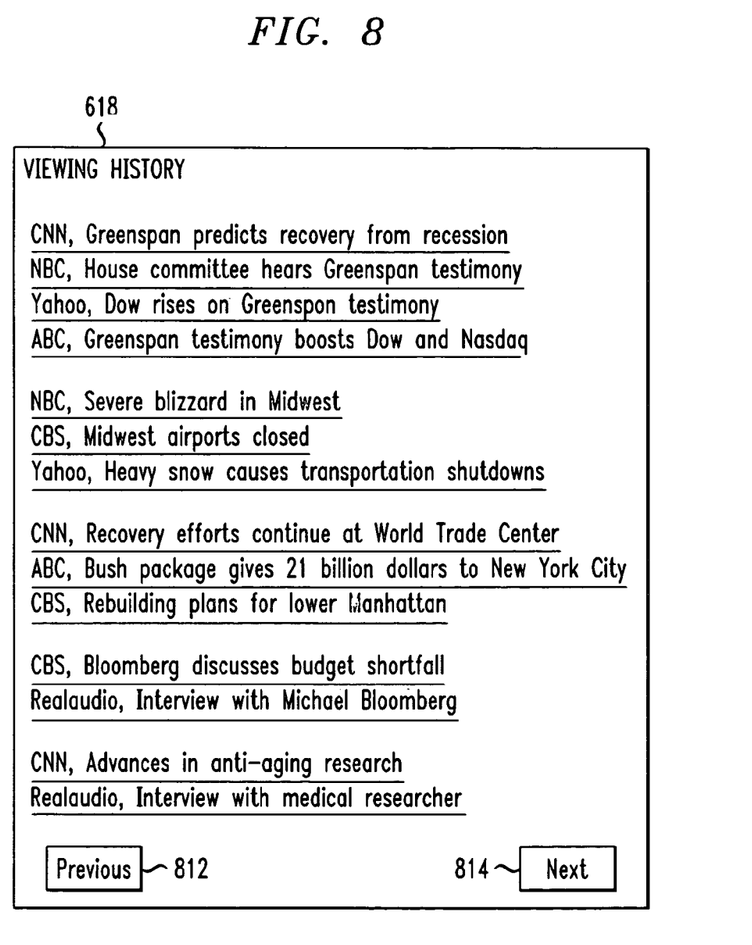
FIG. 8 shows a graphical user interface for examining the viewing history that is stored on a mobile device.

FIG. 8 shows a Web page 618 for examining the viewing history 208 that is stored on the mobile device 122. The page contains hyperlinks to all of the content that has recently been viewed by the consumer. The hyperlinks are presented in the same sequence as the corresponding content was viewed. Previous 812 and next 814 buttons provide access to additional pages of hyperlinks. Each hyperlink allows the consumer to revisit the particular content described by the hyperlink.

Figure 9:
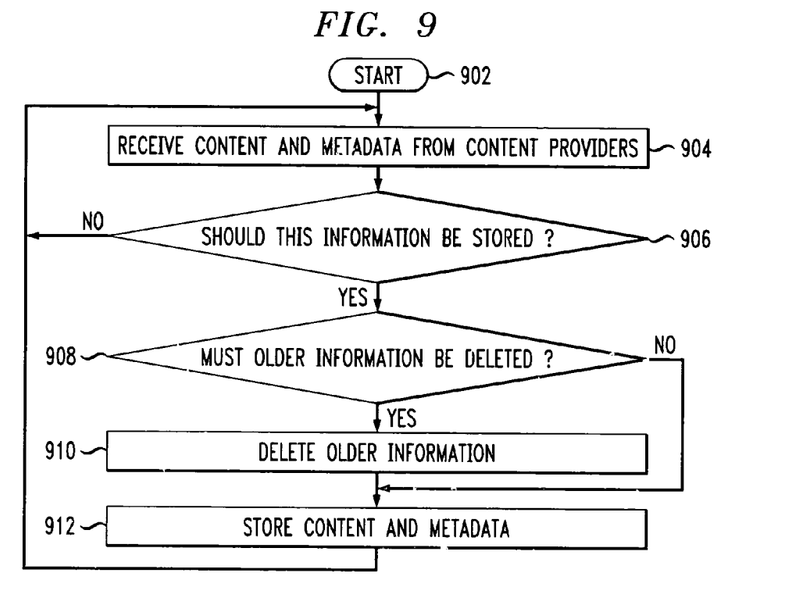
FIGS. 9-10 are flowcharts for a non-mobile device.

FIG. 9 is a flowchart for a non-mobile device 114. It shows the execution of a thread that receives multimedia content and metadata from content providers and decides if that information will be saved in storage 202. Execution begins at step 902. Multimedia content and metadata is received from content providers at step 904. A decision is made at step 906 if this information should be saved. If not, execution continues at step 904. Otherwise, it is determined if older information must be deleted to obtain sufficient storage for this new information at step 908. If no, execution continues at step 912. Otherwise, execution continues at step 910 and the older information is deleted. The new content and metadata is saved in storage 202 at step 912. The routine is then repeated beginning at step 904.

Figure 10:
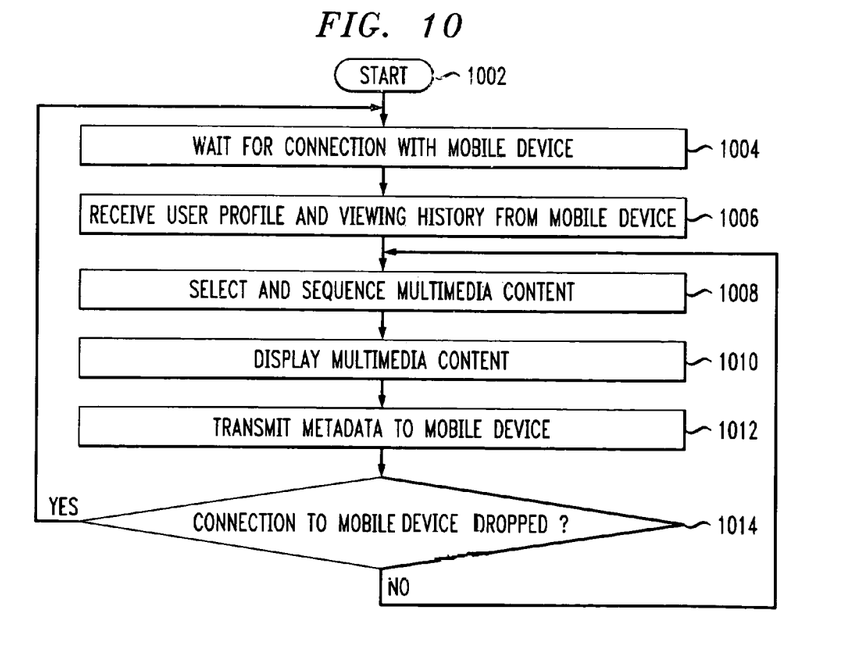

FIG. 10 is a flowchart for a non-mobile device 114. It shows the execution of a thread that waits for a connection from a mobile device 122 and communicates with that device. Execution begins at step 1002. Execution blocks at step 1004 until a short-range wireless connection 126 is established with mobile device 122. The user profile 206 and viewing history 208 are received from that mobile device at step 1006. Based on this information, multimedia content is selected from storage 202 at step 1008. The sequence in which this content will be displayed is also determined. The multimedia content is displayed at step 1010. The metadata for that content is transmitted to mobile device 122 at step 1012. A check is done at step 1014 to determine if the connection to the mobile device has dropped. If yes, execution continues at step 1004. Otherwise, execution continues at step 1008.

Figure 11:
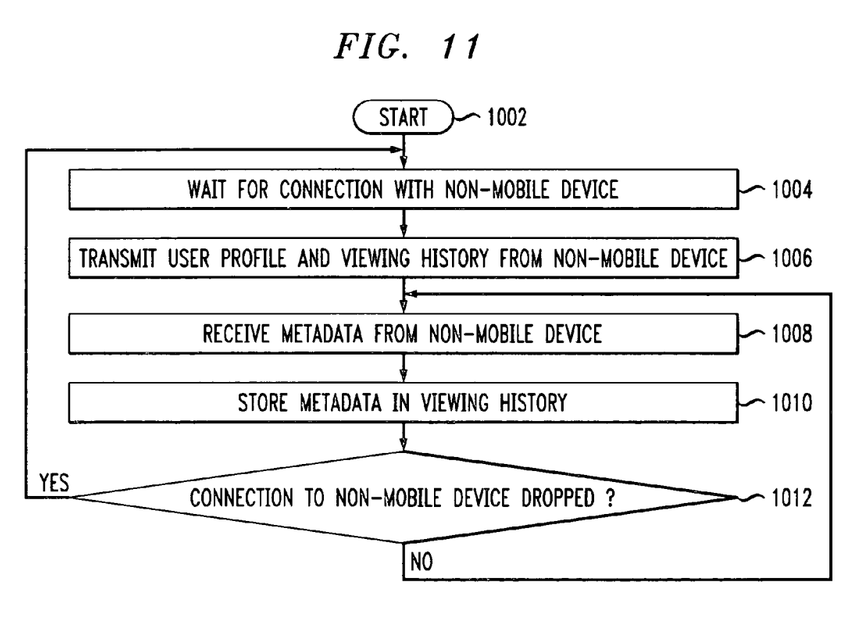
FIG. 11 is a flowchart for a mobile device.

FIG. 11 is a flowchart for a mobile device 122. Execution starts at step 1102. Execution blocks at step 1104 until a short-range wireless connection 126 is established with a non-mobile device 114. The user profile 212 and viewing history 214 are transmitted to the non-mobile device at step 1106. The non-mobile device uses that data as outlined in FIG. 10. Execution blocks at step 1108 until metadata is received from the non-mobile device. This metadata is stored in the viewing history 214 at step 1110. A check is done at step 1112 to determine if the connection to the non-mobile device has dropped. If yes, execution continues at step 1104. Otherwise, execution continues at step 1108.

Figure 12:
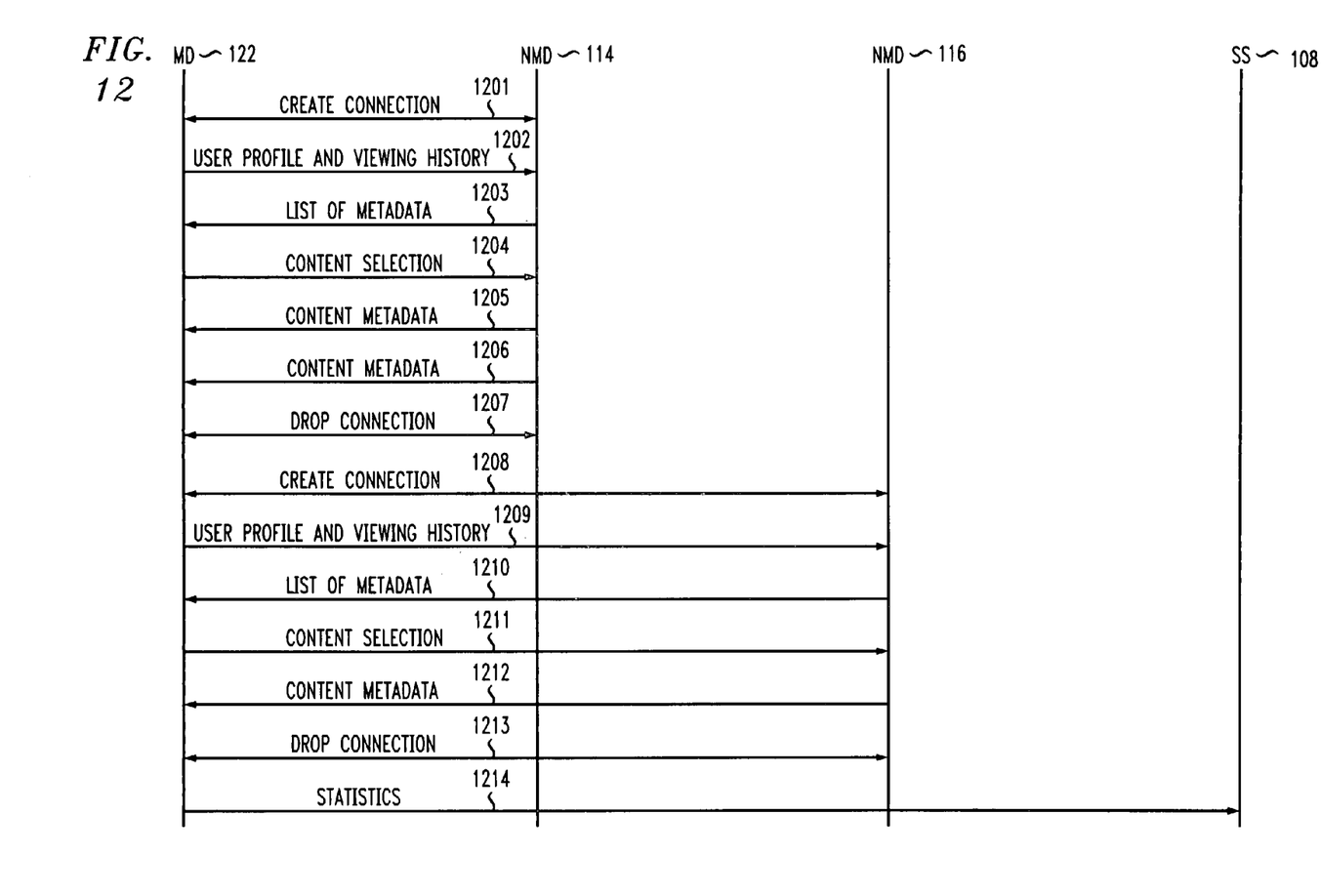
FIG. 12 shows the message sequence for the second embodiment of the present invention.

FIG. 12 shows how a mobile device 122 interacts with two non-mobile devices 114-116 and a statistics server 108. The mobile device 122 and non-mobile device 114 establish a connection via messages 1201 according to techniques in the current art. Message 1202 is then transmitted to the non-mobile device. This message contains the user profile and viewing history. The non-mobile device uses this data to select stored multimedia content. Metadata for the selected content is returned to the mobile device as message 1203. The mobile device examines this metadata and selects and sequences the content for the user. The selection is transmitted to the non-mobile device 114 as message 1204. As content is presented, the metadata for that content is transmitted to the mobile device 122. This is done by messages 1205-1206. This metadata is stored in the viewing history 214 on the mobile device. The mobile device 122 then drops its connection to non-mobile device 114. This is shown as 1207 on the diagram.

The mobile device 122 and non-mobile device 116 establish a connection via messages 1208 according to techniques in the current art. Message 1209 is then transmitted to the non-mobile device. This message contains the user profile and viewing history. The non-mobile device uses this data to select stored multimedia content. Metadata for the selected content is returned to the mobile device as message 1210. The mobile device examines this metadata and selects and sequences the content for the user. The selection is transmitted to the non-mobile device 116 as message 1211. As content is presented, the metadata for that content is transmitted to the mobile device 122. This is done by message 1212. This metadata is stored in the viewing history 214 on the mobile device. The mobile device 122 then drops its connection to non-mobile device 116. This is shown as 1213 on the diagram.

The mobile device 122 may periodically transmit statistics to the statistics server 108. This data may indicate the specific multimedia content that was received by the mobile device. The statistics server can use this information to generate reports that can be distributed to content providers. Mobile devices may also be billed for this service.

Figure 13:
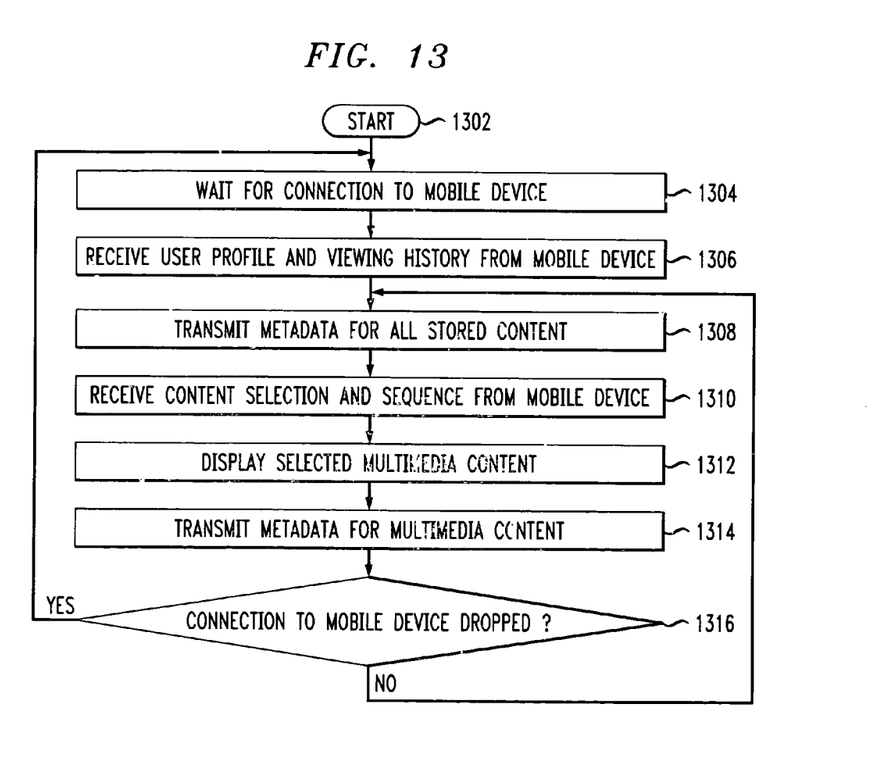
FIG. 13 shows a flowchart for a non-mobile device.

FIG. 13 is a flow chart for non-mobile device 114. It shows the execution of a thread with mobile device 122 to determine what metadata should be communicated to mobile device 122. Execution begins at step 1302. Non-mobile device 114 waits for connection to mobile device 122 at step 1304. The non-mobile device 114 receives a user profile and viewing history from mobile device 122 at step 1306. Metadata is transmitted from non-mobile device 114 to mobile 122 that describes all of the content stored by non-mobile device 114 at step 1308. The mobile device 122 selects content based on the metadata and transmits its content selection and the sequencing for that content at step 1310. The selected multimedia content is displayed by non-mobile device 114 at step 1312. The metadata for the selected content is transmitted to the mobile device at step 1314. A determination is made as to whether the connection to the mobile device has been dropped at step 1316. If the connection has been dropped, the non-mobile device waits for connection to the same or another mobile device and execution returns to step 1304. If the connection has not been dropped, the non-mobile device retransmits a list of all stored content to the mobile device and execution continues at step 1308.

Figure 14:
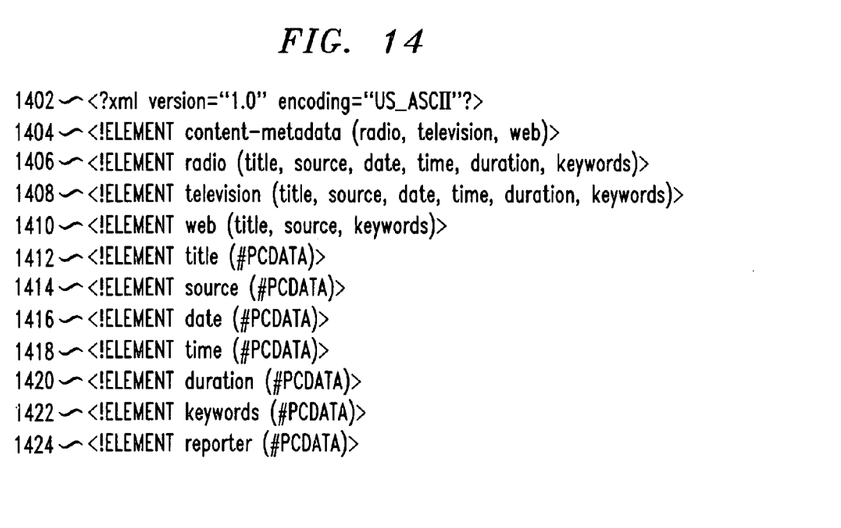
FIG. 14 shows a sample schema for content metadata.

FIG. 14 shows a sample generic schema for content metadata that is transmitted to a mobile device. The schema comprises a plurality of elements that are used to identify multimedia content stored by a non-mobile device and available to the user. Included in these elements is an element 1402 that describes the content type. Types of content include, but are not limited to, radio, television, web pages, etc. Elements 1404, 1406 and 1408 illustrate specific elements for particular types of media. Element 1404 lists the metadata for radio content and includes data such as title, source, date, time, duration of content and keywords associated with the content. Element 1406 lists the metadata for television content and includes data such as title, source, date, time, duration and keywords. Element 1408 lists the metadata for web-based content and includes title, source and keywords. Each data piece of the metadata description is then elaborated in elements 1410-1422.

Figure 15:
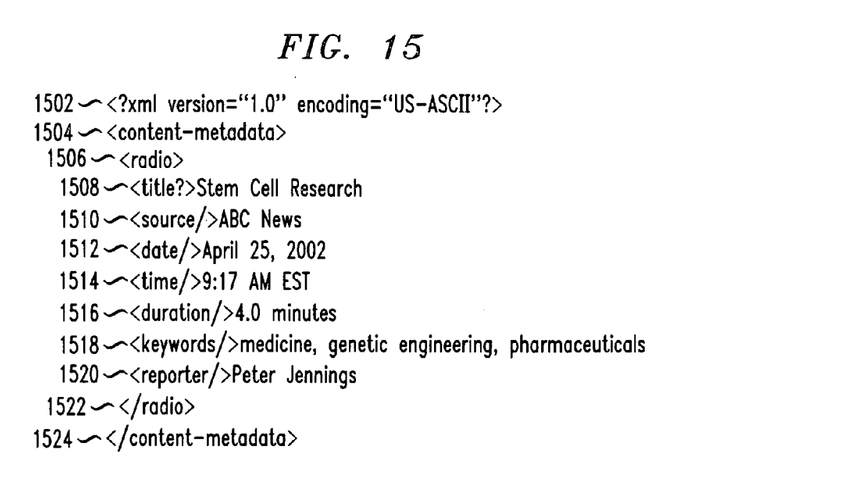
FIG. 15 shows sample metadata for radio content.

FIG. 15 shows a more specific example of sample metadata for radio content. Associated with each of the data factors listed above (e.g., title, source, etc.) more detailed information is provided. In the current example, the multimedia content is a report on stem cell research. The source of the report (e.g., ABC news) is provided along with the data and time of the report and its duration. Any and all of the metadata can be searched to determine if the associated multimedia content is of interest to the user. The metadata is also used to reduce duplicity of content presented to the user.

Figure 16:
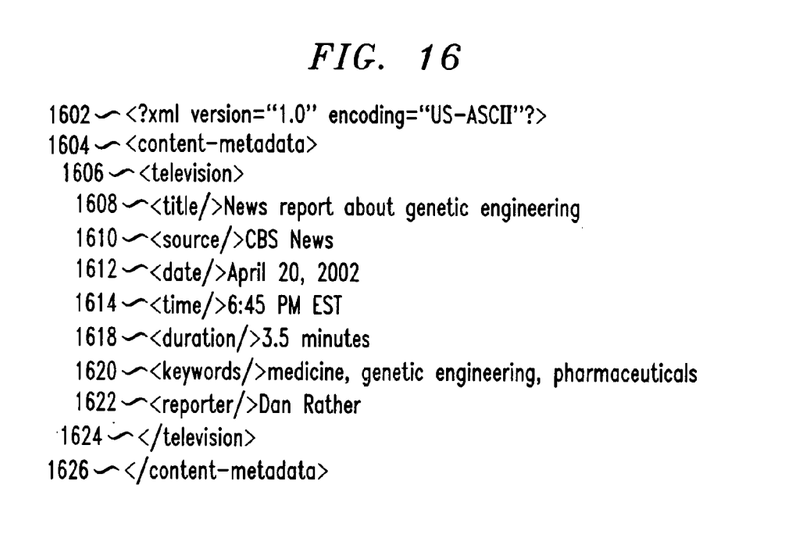
FIG. 16 shows sample metadata for television content.

FIG. 16 shows a more specific example of sample metadata for television content. Associated with each of the data factors listed above (e.g., title, source, etc.) more detailed information is provided. In the current example, the multimedia content is a report on genetic engineering. The source of the report (e.g., CBS news) is provided along with the data and time of the report and its duration. Whether the user wishes to view this content may depend on a number of factors. Some considerations may be what content the user has already been exposed to as identified by the mobile device, historical data regarding the user's preferences (e.g., a preference for particular media, media sources or reporters). Depending upon the amount of content that meets a user's preferences, the amount of content may need to be pared down. Such reduction may occur based on these factors.

Figure 17:
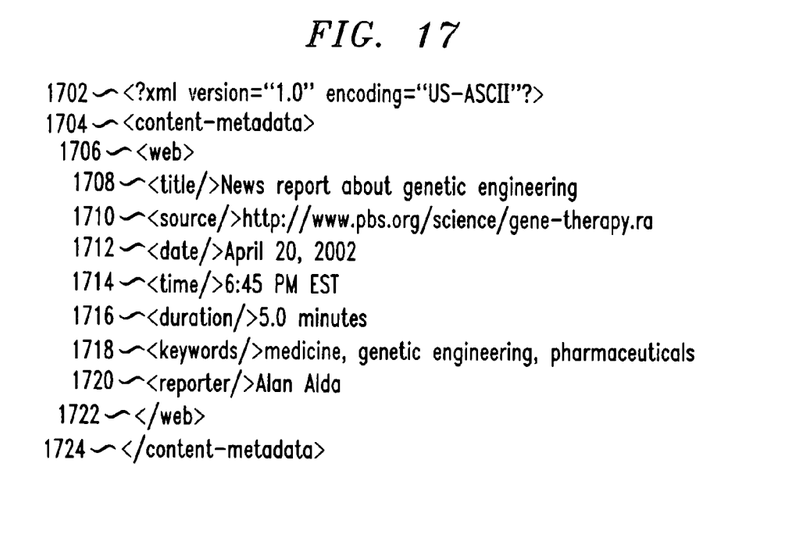
FIG. 17 shows sample metadata for web content.

FIG. 17 shows a more specific example of sample metadata for Web content. In the current example, the multimedia content is a report on genetic engineering. The source of the report is provided on the Internet along with the data and time of the report and its duration. Once all of the metadata is received by the mobile device, it is presented to the user. The user can then select any of the associated multimedia content for viewing and or listening.

While the invention has been described with reference to specific embodiments, modifications and variations of the invention may be constructed without departing from the scope of the invention that is defined in the following claims.

What is claimed is:

1. A mobile device comprising:
a processor;
a short-range wireless transceiver to communicate with a plurality of non-mobile devices, wherein each of the plurality of non-mobile devices receives content and metadata from at least one content provider, the metadata comprising a topic associated with the content;
a module that receives and stores the metadata from the plurality of non-mobile devices in a viewing history table that maintains a viewing history of a non-mobile device of the plurality of non-mobile devices, the metadata comprising an information topic associated with a presentation content;
a controller that searches, selects and sequences at least some content associated with the metadata based on (1) presentation content user preferences comprising an information source, an information topic preference, a date, a time, a duration, and a keyword and (2) the viewing history table to yield a selection and a sequence, wherein performing the selecting and the sequencing prevents duplication of an information summary; and
a module that communicates instructions to the non-mobile device of the plurality of non-mobile devices specifying the presentation content according to the selection and the sequence.

2. The mobile device of claim 1, wherein the presentation content is radio content.

3. The mobile device of claim 1, wherein the presentation content is television content.

4. The mobile device of claim 1, wherein the presentation content is web-based content.

5. The mobile device of claim 1, wherein the presentation content user preferences further comprise a priority ranking of the information source.

6. The mobile device of claim 1, wherein the presentation content user preferences further comprise a priority ranking of the information topic.

7. The mobile device of claim 1, wherein the metadata comprises the information source, an information summary duration, a title of the information summary, and a related information topic.

8. The mobile device of claim 1, the computer-readable storage medium stores further instructions which result in the method further comprising:
transmitting the presentation content user preferences and the viewing history to a network-based profile server.

9. The mobile device of claim 1, wherein the storing and the communicating is performed with a plurality of non-mobile devices and the viewing history table maintains the viewing history of the plurality of non-mobile devices.

10. The mobile device of claim 2, wherein the metadata associated with the radio content comprises a channel, a creation date, and a creation time.

11. The mobile device of claim 3, wherein the metadata associated with the television content comprises a channel, a creation date and a creation time.

12. The mobile device of claim 4, wherein the metadata associated with the web-based content comprises a uniform resource locator, a size of the information summary, a creation date, and a creation time.

13. The mobile device of claim 6, wherein the metadata corresponds to the information summary.

14. The mobile device of claim 12, wherein the metadata is expressed in an extensible markup language format.

15. A method comprising:
receiving metadata at a mobile device from a plurality of non-mobile devices, the metadata corresponding to multimedia content stored by each of the plurality of non-mobile devices and comprising a topic associated with the multimedia content;
selecting at least one of the metadata based on a search logic created using user profiles and viewing history tables stored in the mobile device, the viewing history tables indicating a viewing history of the plurality of non-mobile devices,
storing metadata from a non-mobile device of the plurality of non-mobile devices in a viewing history table stored on the mobile device that maintains a viewing history of the non-mobile device, the metadata comprising an information topic associated with a presentation content;

selecting and sequencing at the mobile device the presentation content based on (1) presentation content user preferences comprising an information source, an information topic preference, a date, a time, a duration, and a keyword and (2) the viewing history table to yield a selection and a sequence, wherein performing the selecting and the sequencing prevents duplication of an information summary; and communicating instructions from the mobile device to the non-mobile device of the plurality of non-mobile devices specifying the presentation content according to the selection and the sequence.

16. The method of claim 15, wherein the presentation content is radio content.

17. The method of claim 15, wherein the presentation content is television content.

18. The method of claim 15, wherein the presentation content is web-based content.

19. The method of claim 15, wherein the presentation content user preferences further comprise a priority ranking of the information source.

20. The method of claim 15, wherein the information source is a television broadcast channel.

21. The method of claim 15, wherein the information source is a radio frequency channel.

22. The method of claim 15, wherein the information source is a web site.

23. The method of claim 15, wherein the presentation content user preferences further comprise a priority ranking of the information topic.

24. The method of claim 15, wherein the metadata corresponds to the presentation content directed to the information topic, the presentation content comprising the information summary.

25. The method of claim 15, wherein the viewing history table is created based on detecting the presentation content viewed by a user in a pervasive computing environment throughout a predetermined time period.

26. The method of claim 15, wherein the storing and the communicating is performed with a plurality of non-mobile devices and the viewing history table maintains the viewing history of the plurality of non-mobile devices.

27. The method of claim 16, wherein the metadata comprises the information source, an information summary duration, a title of the information summary, and a related information topic.

28. The method of claim 16, wherein the metadata associated with the radio content comprises a channel, a creation date, and a creation time.

29. The method of claim 17, wherein the metadata associated with the television content comprises a channel, a creation date and a creation time.

30. The method of claim 18, wherein the metadata associated with the web-based content comprises a uniform resource locator, a size of the information summary, a creation date, and a creation time.

31. The method of claim 30, wherein the metadata is expressed in an extensible markup language format.

32. The method of claim 25, wherein the predetermined time period is defined in hours.

* * * * *